United States Patent
Hyatt et al.

(10) Patent No.: US 12,276,614 B2
(45) Date of Patent: Apr. 15, 2025

(54) SYSTEM AND METHOD FOR IMAGING REFLECTING OBJECTS

(71) Applicant: SIEMENS AKTIENGESELLSCHAFT, Munich (DE)

(72) Inventors: Yonatan Hyatt, Tel-Aviv (IL); Ran Ginsburg, Ramat Gan (IL)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/797,166

(22) PCT Filed: Feb. 7, 2021

(86) PCT No.: PCT/IL2021/050143
§ 371 (c)(1),
(2) Date: Aug. 3, 2022

(87) PCT Pub. No.: WO2021/156873
PCT Pub. Date: Aug. 12, 2021

(65) Prior Publication Data
US 2023/0342909 A1 Oct. 26, 2023

Related U.S. Application Data

(60) Provisional application No. 63/075,153, filed on Sep. 6, 2020, provisional application No. 62/970,833, filed on Feb. 6, 2020.

(30) Foreign Application Priority Data

Feb. 6, 2020 (IL) .......................................... 272538

(51) Int. Cl.
*G01N 21/88* (2006.01)
*G06T 5/50* (2006.01)
(Continued)

(52) U.S. Cl.
CPC ........... *G01N 21/8806* (2013.01); *G06T 5/50* (2013.01); *G06T 7/001* (2013.01); *G06V 10/141* (2022.01);
(Continued)

(58) Field of Classification Search
CPC .. G01N 21/8806; G06V 10/25; G06V 10/141; G06V 10/145; H04N 23/73;
(Continued)

(56) References Cited

U.S. PATENT DOCUMENTS

| 4,065,212 A | | 12/1977 | Belleson et al. |
| 5,245,399 A | * | 9/1993 | Wertz ................... G01N 21/909 |
| | | | 250/226 |

(Continued)

FOREIGN PATENT DOCUMENTS

| EP | 2887055 A1 | * | 6/2015 | ......... G01N 21/8806 |
| EP | 2887055 B1 | | 5/2016 | |
| KR | 101688458 B1 | | 12/2016 | |

OTHER PUBLICATIONS

Je-Kang Park et al., "Machine Learning-Based Imaging System for Surface Defect Inspection", International Journal of Precision Engineering and Manufacturing-Green Technology, Jul. 2016, vol. 3, No. 3, pp. 303-310, Korean Society for Precision Engineering, Seoul, Republic of Korea.

*Primary Examiner* — Matthew David Kim
(74) *Attorney, Agent, or Firm* — Cozen O'Connor

(57) ABSTRACT

A method and system for automated visual inspection of an object include using different patterns of illumination, each pattern including constant frequency pulses of illumination. The pulses of each different pattern of illumination are temporally offset so as to enable obtaining images illuminated by one or another illumination pattern. The images are combined using different parts of the different images in which the most details of the object are available, to produce (Continued)

a full image of the object which is essentially glare-free. The use of constant frequency pulses enables obtaining different pattern illumination images, to enable creating a glare-free image of an object, while providing a flicker-free inspection environment for human workers.

17 Claims, 10 Drawing Sheets

(51) Int. Cl.
*G06T 7/00* (2017.01)
*G06V 10/141* (2022.01)
*G06V 10/145* (2022.01)
*G06V 10/25* (2022.01)
*H04N 23/72* (2023.01)
*H04N 23/73* (2023.01)
*H04N 23/74* (2023.01)
*H04N 23/741* (2023.01)
*H04N 23/56* (2023.01)

(52) U.S. Cl.
CPC ............ *G06V 10/145* (2022.01); *G06V 10/25* (2022.01); *H04N 23/72* (2023.01); *H04N 23/73* (2023.01); *H04N 23/74* (2023.01); *H04N 23/741* (2023.01); *G06T 2207/10144* (2013.01); *G06T 2207/10152* (2013.01); *G06T 2207/20208* (2013.01); *G06T 2207/20212* (2013.01); *G06T 2207/30108* (2013.01); *H04N 23/56* (2023.01)

(58) Field of Classification Search
CPC ...... H04N 23/74; H04N 23/741; H04N 23/72; G06T 5/50; G06T 7/001

USPC ......................................................... 348/129
See application file for complete search history.

(56) References Cited

U.S. PATENT DOCUMENTS

| | | | |
|---|---|---|---|
| 9,144,131 B2* | 9/2015 | Wray | H05B 45/10 |
| 9,224,070 B1 | 12/2015 | Sundareswara et al. | |
| 2003/0182251 A1 | 9/2003 | Kim et al. | |
| 2006/0024040 A1 | 2/2006 | Gladnick et al. | |
| 2010/0215246 A1 | 8/2010 | Albeck et al. | |
| 2010/0225908 A1* | 9/2010 | Kwirandt | G01N 21/9081 |
| | | | 356/239.4 |
| 2012/0128230 A1 | 5/2012 | Maeda et al. | |
| 2012/0154607 A1 | 6/2012 | Moed et al. | |
| 2012/0155741 A1 | 6/2012 | Shibuya et al. | |
| 2014/0152990 A1* | 6/2014 | Ehbets | G01J 3/504 |
| | | | 356/402 |
| 2015/0009320 A1 | 1/2015 | Klein et al. | |
| 2015/0064813 A1 | 3/2015 | Ayotte et al. | |
| 2015/0124124 A1* | 5/2015 | Maeyama | H04N 23/743 |
| | | | 348/235 |
| 2015/0131116 A1 | 5/2015 | Sochi | |
| 2015/0204797 A1 | 7/2015 | Colle et al. | |
| 2017/0024592 A1* | 1/2017 | Xian | G06K 7/10564 |
| 2018/0350060 A1* | 12/2018 | Nakao | G06T 7/194 |
| 2018/0374239 A1 | 12/2018 | Wallack et al. | |
| 2019/0041318 A1* | 2/2019 | Wissmann | G01N 15/05 |
| 2019/0183332 A1* | 6/2019 | Zhang | G01B 11/0625 |
| 2019/0293956 A1* | 9/2019 | Khachaturian | G01S 7/4914 |
| 2020/0007735 A1* | 1/2020 | Kamiya | H04N 23/951 |
| 2021/0034888 A1* | 2/2021 | Ye | G06T 5/94 |
| 2023/0043103 A1* | 2/2023 | Pritchett | G06T 7/246 |

* cited by examiner

SYSTEM AND METHOD FOR IMAGING REFLECTING OBJECTS

CROSS-REFERENCE TO RELATED APPLICATIONS

This is a U.S. national stage of application No. PCT/IL2021/050143 filed 7 Feb. 2021. Priority is claimed on Provisional Applications Nos. 62/970,833 and 63/075,153 filed 6 Sep. 2020, and Israeli Application No. 272538 filed 6 Feb. 2020, the contents of which are incorporated herein by reference in their entirety.

FIELD

The present invention relates to visual inspection processes, for example, inspection of items on a production line.

BACKGROUND

Inspection during production processes helps control the quality of products by identifying defects and acting upon their detection, for example, by fixing them or discarding the defected part, and is thus useful in improving productivity, reducing defect rates, and reducing re-work and waste.

Automated visual inspection methods are used in production lines to identify visually detectable anomalies that may have a functional or esthetical impact on the integrity of a manufactured part. Existing visual inspection solutions for production lines, using cameras, rely on custom made automated visual inspection systems, which are typically highly expensive and require expert integration of hardware and software components, as well as expert maintenance of these in the life-time of the inspection solution and the production line.

When using automated visual inspection, image quality affects the ability of a processor running algorithms for inspection, to reliably carry out inspection tasks, such as, defect detection, quality assurance (QA), sorting and/or counting, gating, etc.

For instance, glossy or reflective items (such as pills or other items in a clear plastic wrapping) usually have a surface that reflects light in a specular (mirror-like) direction, as opposed to matte objects that reflect light diffusely, in many directions. Other factors that can affect gloss include the refractive index of the material, the angle of incident light and the surface topography. Due to the specular reflection of glossy objects, images of glossy objects will typically include a glare, which can obscure details of the imaged object. Thus, images of glossy objects are unsuitable for visual inspection tasks.

SUMMARY

Embodiments of the invention provide a system and method for obtaining a substantially glare-free image of an item, during visual inspection processes, for any type of item, with minimal setup.

Different illumination and possibly different exposure patterns may be automatically tested during a setup stage of the inspection process, to determine the illumination/exposure pattern(s) that will enable maximizing the information collected for each object and enable obtaining a substantially glare-free image for each object type.

The illumination/exposure pattern determined during the setup stage can then be used to obtain images of same-type objects during the inspection stage. Additionally, illumination patterns may be automatically adjusted based on orientation of the object in the image, such that even if objects are orientated in the inspection stage differently than in the setup stage, the information collected during the setup stage can still be used to determine which illumination patterns to use during the inspection stage.

Testing different illumination/exposure patterns during the setup stage enables to determine the minimal set of different illumination/exposure patterns required for obtaining maximal information of the object. Because adding each illumination/exposure pattern requires capturing another image, which prolongs the overall inspection time, determining the minimal number of required illumination/exposure, patterns provides a shorter overall inspection time.

A system for automated visual inspection, according to embodiments of the invention, includes a camera configured to capture images of an object on an inspection line, a light source to illuminate at least a portion of the camera field of view (FOV), and a processor in communication with the camera and light source.

In some embodiments the light source produces light pulses. The processor controls the light source to differentially illuminate the camera FOV and ensures that camera exposure events are in synchronization with the light pulses, to produce a plurality of different images, each being captured in a different illumination pattern.

In one embodiment the processor controls one segment of the light source to illuminate in a first pattern of pulses and a second segment to illuminate in a second pattern of pulses. Typically, the pulses of the first pattern and second pattern are each at a constant frequency. The pulses of the first pattern and second pattern may be offset from each other, such that there are times of overlapping pulses and times of no overlap. The processor may control an exposure event of the camera to coincide with a time in which there is no overlap of pulses between the first pattern and second pattern. An image captured during this exposure time may be used to detect the object in the image and/or may be used as one of a plurality of different illumination pattern images combined to provide a combined image for visual inspection.

In some embodiments, the processor may control a first exposure event of the camera to coincide with a time in which pulses in both the first pattern and second pattern overlap and a second exposure event to coincide with a time in which pulses in the first pattern and second pattern do not overlap. The image captured during the first exposure event may be used to detect the object in the image and/or may be used as one of the different illumination pattern images combined to provide a combined image for visual inspection.

The processor may then determine which of the plurality of images, when combined, provide a combined image of the object showing the most detail of the object. The determined images may then be combined to provide a combined image, which is a substantially glare-free image. Visual inspection can be performed on the combined image.

The term "visual inspection" may include displaying the image to a user and/or applying visual inspection algorithms on the image. As further detailed herein, a "visual inspection algorithm" refers to a sequence of automatically performed steps that are designed to detect objects on an inspection line, from images, and classify the objects based on requirements of the inspection process. For example, a requirement of an inspection process may be to detect defects on the object and/or perform other inspection tasks, such as QA, sorting and/or counting, gating, etc. Visual inspection algorithms, according to embodiments of the invention, typically include using computer vision techniques.

BRIEF DESCRIPTION OF THE FIGURES

The invention will now be described in relation to certain examples and embodiments with reference to the following illustrative figures so that it may be more fully understood. In the drawings.

DETAILED DESCRIPTION

Figure 1A:
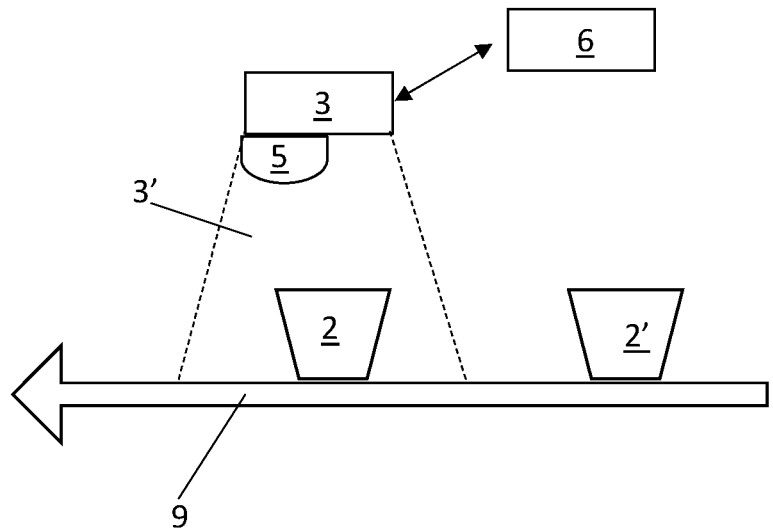
FIGS. 1A and 1B schematically illustrate a setup stage and an inspection stage according to embodiments of the invention.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "analyzing", "processing," "computing," "calculating," "determining," "detecting", "identifying", "creating", "producing", "obtaining", "applying" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Unless otherwise stated, these terms refer to automatic action of a processor, independent of and without any actions of a human operator.

The terms "item" and "object" may be used interchangeably and are meant to describe the same thing.

The terms "same-type items" or "same-type objects" refer to items or objects which are of the same physical makeup and are similar to each other in shape and dimensions and possibly color and other physical features. Typically, items of a single production batch or series, or batch of items in the same stage on the production line, may be "same-type items". For example, if the inspected items are sanitary products, different sink bowls of the same batch are same-type items. Same type items may differ from each other within permitted tolerances.

A defect may include, for example, a visible flaw on the surface of the item, an undesirable size of the item or part of the item, an undesirable shape or color of the item or part of the item, an undesirable number of parts of the item, a wrong or missing assembly of interfaces of the item, a broken or burned part, and an incorrect alignment of the item or parts of the item, a wrong or defected barcode, and in general, any difference between the defect-free sample and the inspected item, which would be evident from the images to a user, namely, a human inspector. In some embodiments a defect may include flaws which are visible only in enlarged or high-resolution images, e.g., images obtained by microscopes or other specialized cameras.

Typically, a visual inspection process uses images of items confirmed by a user, as references to which unconfirmed images of same-type items are compared, to detect defects on the item in the unconfirmed image or for other inspection tasks, such as QA, sorting, gating, counting and more. The user confirmed images (also referred to as "reference images") are usually obtained during a setup stage prior to an inspection stage.

Figure 1B:
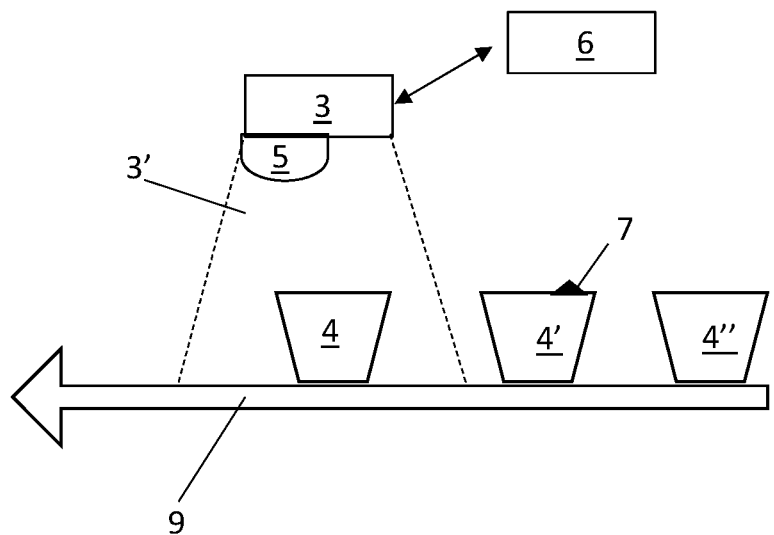

FIGS. 1A and 1B schematically illustrate a setup stage and inspection stage, correspondingly, according to embodiments of the invention.

In the setup stage, two or more samples of a manufactured item of the same type, (in some embodiment, the samples are items with no defects), e.g., defect free sample items 2 and 2', are placed in succession within a field of view (FOV) 3' of (one or more) camera 3. For example, defect free sample items 2 and 2' may be placed on an inspection line which includes conveyor belt 9 such that movement of the conveyor belt 9 first brings item 2 into the FOV 3' and then brings item 2' into the FOV 3'. Images captured by camera 3 may be displayed on a user interface device 6.

Each defect free sample item 2 and 2' is illuminated by light source 5 and imaged by camera 3. These images, which may be referred to as setup images or reference images, may be obtained under different conditions, as described below, for example, by using in each frame different illumination patterns and/or different imaging parameters of camera 3, for example different focuses and exposure times. A processor may analyze the relation between different images of a same type of item which were obtained under the different conditions. This analysis during the setup stage enables to continually optimize the illumination and imaging parameters with minimal processing time during the following inspection stage.

In one embodiment, the analysis of the setup images is used to determine a spatial range in which the items (e.g., items 2 and 2') show no significant perspective distortion when aligned with another same type of item. The level of perspective distortion between items in different images can be analyzed, for example, by detecting regions in an item which do not have corresponding features between the setup images, by analyzing the intersection location and angles between the items' borders or marked areas of interest on the items, etc. The borders of the spatial range may be calculated by comparing two (or more) setup images (in which items may be positioned and/or oriented differently) and determining which of the images show perspective distortion and which do not.

The calculated range can then be used to determine the borders of where and/or in which orientation, scale or other dispositioning, an inspected item may be placed on the inspection line so as to avoid distortion when compared with the reference images. Additionally, by using a set of setup images as references for each other, the processor can detect images having similar spatial decomposition and this set of images can then be analyzed to see if there are enough similar setup images to allow registration, defect-detection and other analyses for each possible positioning of the item on the inspection line.

Analysis of the setup images may be performed to collect characteristics of an item, information regarding possible 2D (two dimensional) shapes and 3D (three dimensional) characteristics (e.g., rotations on the inspection line) of an item or to find uniquely discriminative features of the item and the spatial relation between these unique features, as preserved between the setup images. Also, complete representation of a type of item is achieved when the range of shape tolerance characteristic to this item and the surface variations characteristic to this item are all manifested in the set of setup images.

Based on the information collected from setup images, a processor can detect a second item of the same type and perform inspection tasks, even if the second item was not previously learned by the processor. This allows the processor to detect when a new item (of the same type) is imaged, and then to analyze the new item, for example, to run visual inspection algorithms that typically include comparing images of the new item to reference images of the same type item to identify differences between the reference and new item images, e.g., to search for a defect on an inspected item. Other tasks performed by the visual inspection algorithms may include sorting between different objects on the production-line, decoding codes (such as DMC, QR codes and others), counting the number of objects currently on the production-line, and others.

Instructions to a user regarding adjustment of camera and/or illumination parameters can be displayed to the user via a user interface device 6. Once it is determined, based on the analysis of the reference images, that enough information about the item is obtained, the setup stage may be concluded and a notification is displayed or otherwise presented to a user, via user interface device 6, to stop placing samples (sample items 2 and 2') on the conveyor belt 9 and/or to place on the conveyor belt 9 inspected items 4, 4' and 4" (as shown in FIG. 1B).

In the inspection stage (which is schematically illustrated in FIG. 1B) that follows an initial setup stage, inspected items 4, 4' and 4", which are of the same type as sample items 2 and 2' and which may or may not have defects, are imaged in succession by camera 3. These images, which may be referred to as inspection images, are analyzed using visual inspection algorithms, which include using computer vision techniques (e.g., including machine learning processes) to enable performing inspection tasks (such as, defect detection, QA, sorting and/or counting) on items 4, 4' and 4". In the example illustrated in FIG. 1B, item 4' includes a defect 7, whereas items 4 and 4" are defect free. In embodiments of the invention the inspection images are illuminated by light source 5 in a pattern which has been determined during the setup stage.

Setup processes may be performed prior to the inspection stage and during the inspection stage. In some embodiments, reference images may be analyzed (e.g., as described above) throughout the inspection process, not necessarily only during an initial setup stage, an example of which is described in FIG. 1A. For example, an inspection image labeled by a user and/or by the visual inspection algorithm (e.g., either as defected or defect-free) during the inspection stage, may then be saved as a new reference image (e.g., in a reference image database, as described below) to be analyzed and possibly update the information collected during the initial setup stage.

Although a particular example of a setup and inspection stage of a visual inspection process is described herein, it should be appreciated that embodiments of the invention may be practiced with other setup and inspection procedures of visual inspection processes.

Figure 1C:
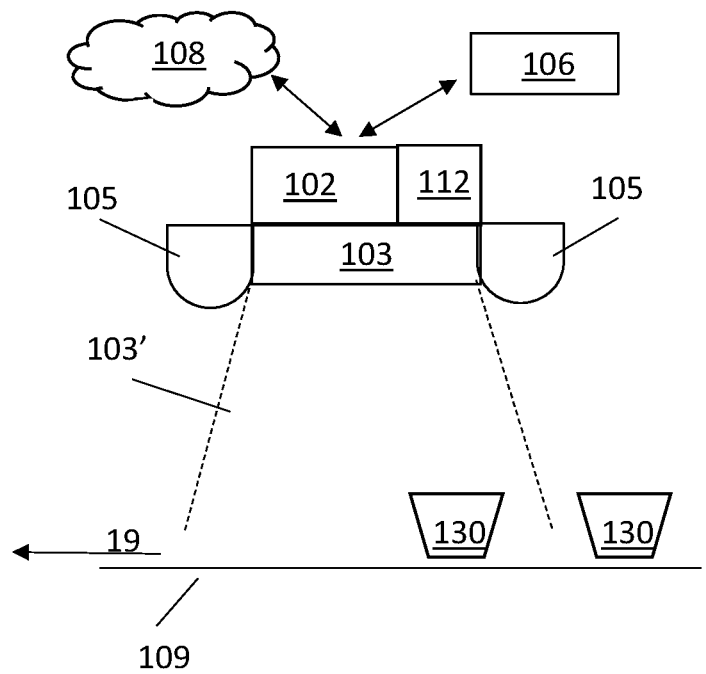
FIG. 1C schematically illustrates a system for automated visual inspection, according to embodiments of the invention.

An exemplary system which may be used for automated visual inspection of an item on an inspection line, according to embodiments of the invention, is schematically illustrated in FIG. 1C. In one embodiment the system includes a processor 102 in communication with one or more camera(s) 103 and with one or more light source(s) 105. Processor 102 may also be in communication with a device, such as a user interface device 106 and/or other devices, such as storage device 108.

Components of the system may be in wired or wireless communication and may include suitable ports and/or network hubs. In some embodiments processor 102 may communicate with a device, such as storage device 108 and/or user interface device 106 via a controller, such as a programmable logic controller (PLC), typically used in manufacturing processes, e.g., for data handling, storage and processing power and communication capabilities. A controller may be in communication with processor 102, storage device 108, user interface device 106 and/or other components of the system (such as camera 103 and light source 105), via USB, Ethernet, appropriate cabling, etc.

Processor 102 may include, for example, one or more processors and may be a central processing unit (CPU), a graphics processing unit (GPU), a digital signal processor (DSP), a field-programmable gate array (FPGA), a microprocessor, a controller, a chip, a microchip, an integrated circuit (IC), or any other suitable multi-purpose or specific processor or controller. Processor 102 may be locally embedded or remote, e.g., cloud based.

The user interface device 106 may include a display, such as a monitor or screen, for displaying images, instructions and/or notifications to a user (e.g., via text or other content displayed on the monitor). User interface device 106 may also be designed to receive input from a user. For example, user interface device 106 may include a monitor and keyboard and/or mouse and/or touch screen, to enable a user to input feedback.

Storage device 108 may be a server including for example, volatile and/or non-volatile storage media, such as a hard disk drive (HDD) or solid-state drive (SSD). Storage device 108 may be connected locally or remotely, e.g., in the cloud. In some embodiments, storage device 108 may include software to receive and manage image data related to reference images. A reference image database may be located at storage device 108 or at another location.

Camera(s) 103, which are configured to obtain an image of an object 130 on an inspection line 109, are typically placed and possibly fixed in relation to the inspection line 109 (which may include e.g., a conveyer belt, a robotic arm, etc.), such that items placed on the inspection line are within the FOV 103' of the camera 103.

Typically, inspection line 109 moves, e.g., in direction of arrow 19, thereby moving the items on it. Each item 130 is within the field of view 103' of the camera 103 for a certain amount of time, termed herein an "inspection window", and is then moved out of the camera FOV 103'. In other embodiments, the inspection line need not move, rather the camera 103 may be moved to capture each of items 130 within its field of view 103'.

An inspection line typically operates to repetitively run inspection windows. An inspection window may last several seconds, which means, depending on the frame capture rate of the camera 103, that several images of each item 130 may be captured in each inspection window. In one embodiment the camera 103 captures images at a rate of 30 frames per second (fps) or below, e.g., 20 fps, to obtain a video. In other embodiments camera 103 operates at a frame rate of above 30 fps, for example, in some embodiments, the camera 103 operates at 60 fps or above.

Camera 103 may include a CCD or CMOS or another appropriate image sensor. The camera 103 may be a 2D or 3D camera. In some embodiments, the camera 103 may include a standard camera provided, for example, with mobile devices such as smart-phones or tablets. In other embodiments the camera 103 is a specialized camera, e.g., a camera for obtaining high resolution images. In some embodiments camera 103 may be designed to image at IR or near IR wavelengths. For example, the camera 103 may include a suitable filter.

The system also includes a light source 105, to illuminate at least a portion of the camera 103 field of view 103'. In one embodiment (which is schematically shown in FIG. 1C), light source 105 surrounds camera 103. Light source 105 may include segments, each segment being capable of illuminating independently from other segments and each segment capable of being controlled independently from the other segments. For example, light source 105 may include separate LEDs or groups of LEDs, which can be turned ON/OFF independently. The different segments of light source 105 may be physically separated, e.g., by an opaque barrier placed in between the segments.

In some cases, e.g., when using light sources that have a transformer that causes a "switch-on delay" (e.g., LEDs), in order to avoid the delay, turning the light source 105 ON/OFF includes increasing the light intensity of the light source when "turning on" and greatly lowering the intensity (to a point where the light is negligible) when "turning off", rather than fully powering off the light source.

One or more of each separate segment may include a diffuser (e.g., a film of translucent material) to provide diffuse, uniform illumination. In one embodiment light source 105 includes LEDs of different wavelengths, e.g., some of the LEDs may illuminate at near IR and some of the LEDs may illuminate white light. Turning each separate LED ON/OFF will cause light source 105 to illuminate at a different wavelength. In other embodiments, each segment (e.g., each LED or each group of LEDs) can be controlled to illuminate at a different intensity.

Processor 102 receives image data (which may include data such as pixel values that represent the intensity of reflected light as well as partial or full images or videos) of objects on the inspection line (which are illuminated by light source 105) from the one or more camera(s) 103, and runs processes according to embodiments of the invention.

Processor 102 is typically in communication with one or more memory unit(s) 112. Memory unit 112 may store at least part of the image data received from camera(s) 103.

Memory unit 112 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

In some embodiments the memory unit 112 stores executable instructions that, when executed by processor 102, facilitate performance of operations of processor 102, as described herein.

In one embodiment, processor 102 is in communication with the camera 103 and light source 105, and controls the light source 105 to illuminate different portions of the FOV 103' in synchronization with camera 103 exposure events. This way, a plurality of different-illumination-pattern images of object 130 are obtained. In each different-illumination-pattern image, different areas of the object may be differently illuminated.

Figure 2A:
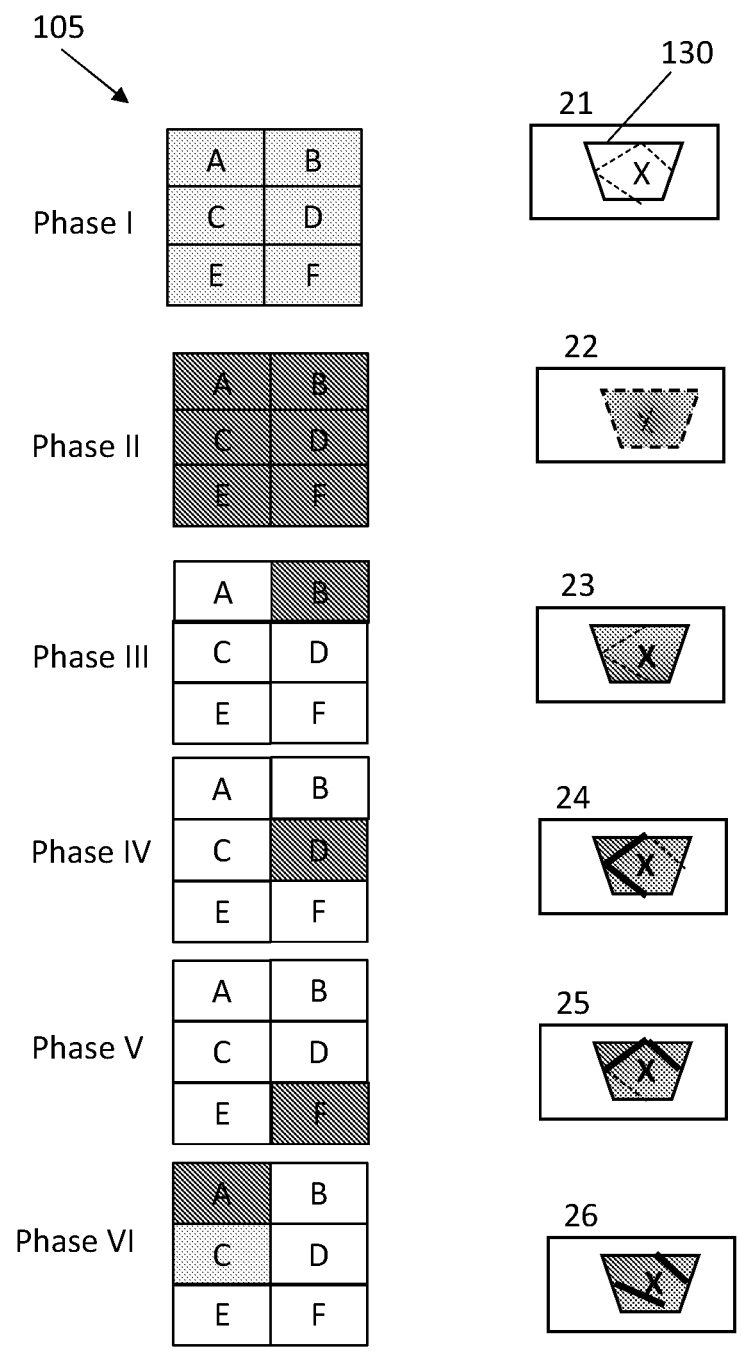
FIGS. 2A and 2B schematically illustrate different illumination patterns and camera exposure timing, according to embodiments of the invention.

For example, as schematically illustrated in FIG. 2A, light source 105 may include six different segments A, B, C, D, E and F. For example, light source 105 may include a flat dome light (which includes a diffusor and a hole template on the diffusor) with six differently controlled segments. Alternatively, light source 105 may include six (or another number) surrounding spot lights, each spot light illuminating a portion of the camera FOV 103', and all six spot lights together illuminating the whole FOV 103' of the camera 103. Other numbers of segments and segmentation options of the light source can be used according to embodiments of the invention. For example, four different illuminating segments may surround a camera and may be differently controlled to provide different-illumination-pattern images.

In one example, processor 102 may simultaneously control one segment to illuminate and another segment to be shut off. In other examples, processor 102 can control the different segments to simultaneously illuminate at different intensities. For example, one or a few segments can be controlled to illuminate at a high intensity and another segment (or segments) can be controlled to illuminate at a low intensity.

In one example, pulse duration modulation (PDM) may be used to provide different intensities from light source 105, as further exemplified below.

Processor 102 controls light source 105 to illuminate different illumination patterns, typically in synchronization with exposure events of the camera 103.

Light source 105 may illuminate high-frequency pulses of light to enable obtaining several short exposure images of each object 130, allowing a shorter overall imaging time, which among other benefits, allows faster sampling of a moving object while it is still within a single inspection window. In some embodiments, some of the light pulses are at a high intensity, to enable capturing well-lit images of the item 130, whereas the other pulses are at a lower intensity, so as to prevent quick burn out of the light source. The high intensity pulses may be specifically timed (or the camera exposure events can be specifically timed) to enable capturing several images of the object while it is still within the inspection window and before the object has moved (e.g., due to movement of the inspection line) too much, to enable capturing images of the object from the same point of view and without blurring due to the motion effect.

Using high frequency pulses of high intensity light in combination with a camera operating at a high frame rate (e.g., above 30 fps, such as, 60 fps or above), enables capturing several images of the object (each image with a different illumination pattern) within a short period of time, thereby reducing the issues created by imaging moving objects (such as blurriness and changing points of view, as discussed above).

FIG. 2A illustrates an exemplary differential illumination schedule. In a first phase, phase I, camera 103 captures images (e.g., image 21) in video mode and all segments of light source 105 are lit, typically at low intensity (which enables energy saving and will not exceed the power consumption supported by the light source hardware). For example, light source 105 may include six 12 W LEDs. The 12 W LEDs can be operated at a 50% duty cycle (i.e., can be turned on 50% percent of the time and off (or very low) 50% of the time) during phase I to provide medium or low intensity illumination. Object 130 is visible in image 21 however not all details of the object are clear (as indicated by the dashed lines), due to the illumination being reflected off the object and/or because of low intensity of the illumination.

Once object 130 is detected in the low intensity illumination image 21 (and possibly determined to be in a predetermined spatial range on the inspection line, as discussed above) processor 102 controls light source 105 to transition to phase II, in which all segments of light source 105 are lit at high intensity to enable getting a well-lit image 22 of the object. For example, all six 12 W LED may be operated at 95% duty cycle (i.e., on 95% percent of the time and off (or very low) 5% of the time) during phase II. However, if object 130 has reflecting surfaces (if, for example, object 130 is a coated PCB or plastic or glass object) image 22 may show reflection (glare), thereby obscuring some of the details of object 130. In this case, processor 102 controls light source 105 to illuminate in several different partial patterns, such as in phases III-VI.

In phase III only segment B is on, e.g., at 50% or higher duty cycle, and segments A, C, D, E and F are off (or very low). Alternatively, segment B may be illuminating high intensity light, e.g., at 95% duty cycle, while one or more of segments A, C, D, E and F are illuminating low intensity light, e.g., at 50% duty cycle or lower, so as to avoid glare in certain parts of the image.

Similarly, in phase IV segment D is on and segments A, B, C, E and F are off. Alternatively, segment D may be illuminating high intensity light, while one or more of segments A, B, C, E and F are illuminating low intensity light. Similarly, in phase V segment F is on and segments A, B, C, D and E are off. Alternatively, segment F may be illuminating high intensity light, while one or more of segments A, B, C, D and E are illuminating low intensity light.

In phase VI segments A and C are on whereas the other segments are off. In phase VI, each of segment A and C may be illuminating at a different intensity and/or different wavelength.

In each phase the segments that are on may be turned on in typically high frequency, short illumination pulses.

The illumination pulses are typically synchronized with the camera 103 shutter such that, in the case exemplified in FIG. 2A, each of different-illumination-pattern images 21, 22, 23, 24, 25 and 26 is obtained during an exposure event of camera 103. In other embodiments, e.g., as described in FIG. 2B, different illumination patterns may at least partially overlap in time, such that exposure events of the camera 103 may capture several different illumination patterns simultaneously.

In each of images 21-26, different details of the object 130 are visible while other details are obscured due to glare from different portions of the images. If images 21-26 were to be combined, each image "contributing" its visible details, the combined image would be a well-lit image of object 130 with all or a maximum (namely, a sufficient amount or most of) of its details visible to enable an inspection task, such as defect detection.

In order to avoid visible flickering in the video captured by camera 103 and/or flickering that may be irritating for plant workers, high frequency pulses of light may be used. For example, processor 102 may control light source 105 to illuminate pulses of light at a frequency higher than the sampling frequency of a human eye, as pulses at a frequency higher than the sampling frequency of the eye will typically not be noticed by a person. Additionally, as long as illumination pulses are at a consistent frequency, flickering (e.g., due to changes in illumination intensity) will not be noted by a person.

In one embodiment, processor 102 controls a first segment of light source 105 to illuminate in a first pattern of pulses and a second segment of light source 105 to illuminate in a second pattern of pulses. The pulses in each illumination pattern are at a constant, unvarying frequency.

In one embodiment, the pulses of the first pattern and second pattern are offset from each other. In this embodiment, processor 102 may control a first exposure event of camera 103 to coincide with a time in which a pulse in both the first pattern and second pattern overlap and a second exposure event of camera 103 to coincide with a time of a pulse in either the first pattern or the second pattern, but in which there is no overlap of pulses in the first pattern and second pattern.

An image of an object 130 captured during the first exposure event can be used to detect the object 130, whereas parts of images of object 130 captured during the exposure event coinciding with a time of a pulse of either the first pattern or the second pattern (when there is no overlap of pulses), may be used (possibly together with at least a part of the image captured during the first exposure event) to provide a combined image on which to apply inspection algorithms to provide inspection of object 130.

Figure 2B:
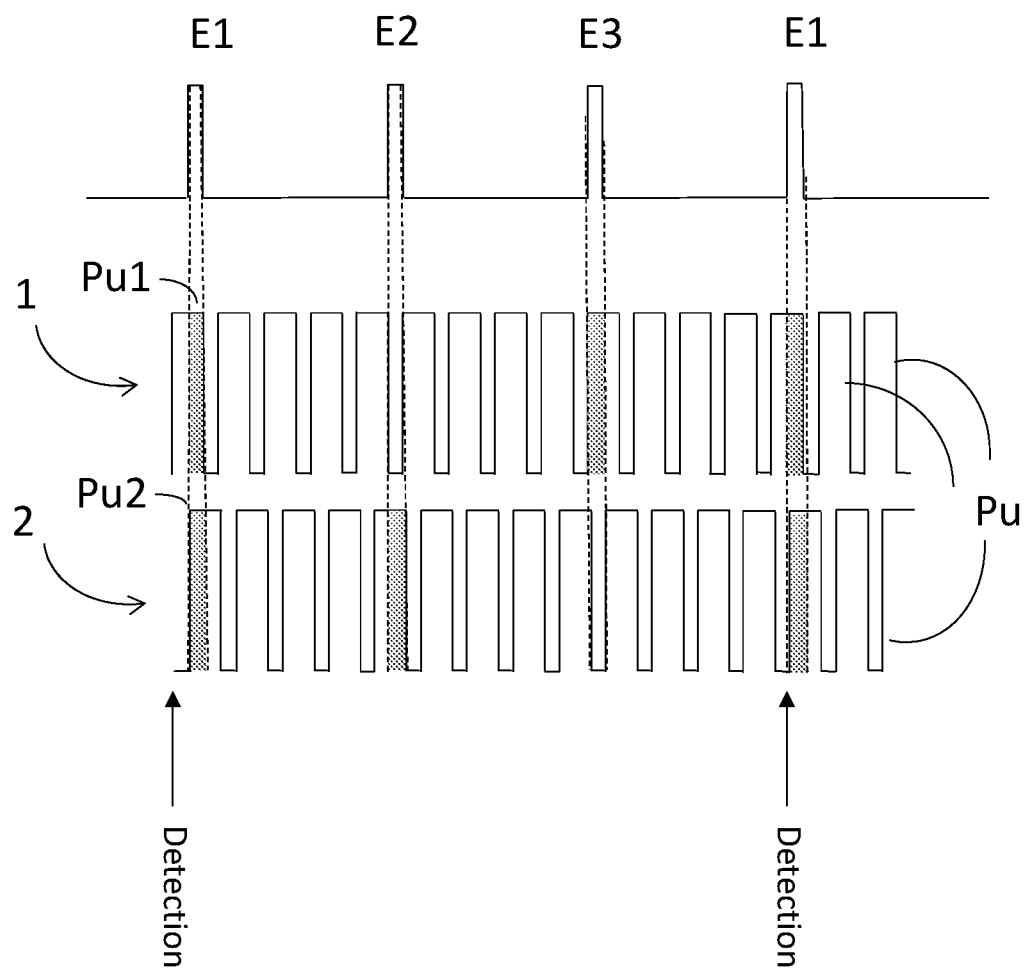

In one embodiment, which is schematically illustrated in FIG. 2B, illumination patterns and camera exposure events are synchronized such that an image illuminated by all light segments (e.g., image 21 or 22) as well as partially illuminated images (e.g., images 23, 24, 25 or 26) may be captured while maintaining a consistent frequency of light pulses so as to provide a flicker-free inspection environment for human workers. For example, a first pattern of illumination (1) includes only the right-side segments being on (e.g., segments A, C and E) whereas a second pattern of illumination (2) includes only the left side segments being on (e.g., segments B, D and F). Each of the patterns includes light pulses (Pu) repeated at a constant, unvarying frequency, however, the pulses of the first pattern of illumination are temporally offset in relation to the pulses of the second pattern of illumination. This offsetting of pulses enables one camera exposure event (E1) to capture an image illuminated simultaneously by part of a light pulse (Pu1) from the first pattern and part of a light pulse (Pu2) from the second pattern, thus obtaining an image illuminated by all segments (both right side and left side segments).

At the time of a second camera exposure event (E2) the illumination in the first pattern is on but the illumination in the second pattern is off. Thus, the image captured during E2 is illuminated by only a pulse (or part of the pulse) from the first pattern, namely, illuminated by the segments on the right side. At the time of a third camera exposure event (E3) the illumination in the first pattern is off but the illumination in the second pattern is on. Thus, the image captured during E3 is illuminated by only a pulse (or part of the pulse) from the second pattern, namely, illuminated by the segments on the left side.

The image captured during exposure event E1 may be used to detect an object (e.g., object 130) on an inspection line. Images captured during exposure events E2 and E3 provide different illumination pattern images that may be combined (possibly together with parts of the image obtained during E1) to create a maximum-detail image of the object.

In some cases, a minimal number of images per object may be desired, e.g., to avoid blurriness and changing points of view when inspecting a moving object. In such embodiments, the camera may be set for less exposure events, e.g., only events E2 and E3. An image captured during exposure event E2 may be used to detect the object and to provide a first illumination pattern image whereas the image captured during exposure event E3 provides a second illumination pattern image. Thus, less images of the object may be used to create a maximum-detail image of the object.

Figure 3:
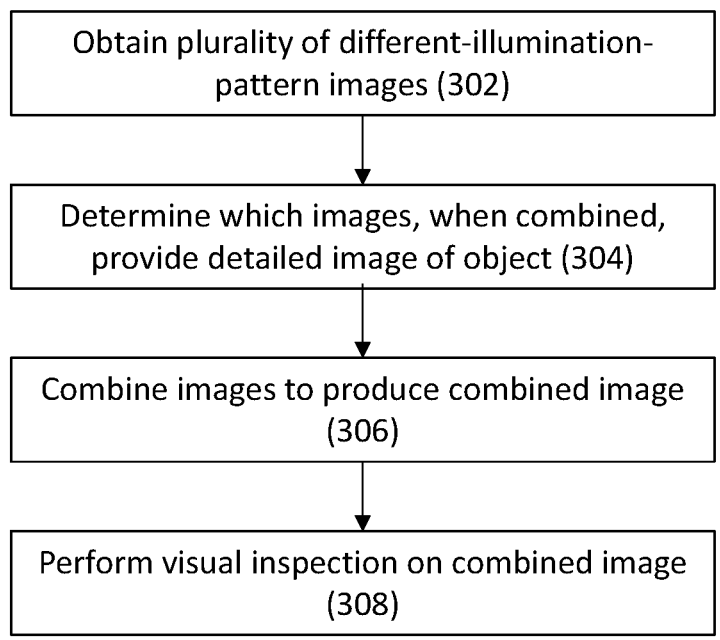
FIG. 3 schematically illustrates a method for obtaining a substantially glare-free image for visual inspection, according to embodiments of the invention.

As schematically illustrated in FIG. 3, processor 102 receives, in step 302, a plurality of different-illumination-pattern images of an object (e.g., images 21-26 of object 130) and determines which of the plurality of images are images having a specific illumination pattern, such that when combined, provide a combined image of the object showing the most detail of the object (step 304). This step can be performed by comparing the images or pixels of the images, to each other. In some embodiments, processor 102 will search for the minimal number of images required to achieve a combined image. Typically, a measure of information can be determined for each of the images and may be used in combining images, as further detailed below.

Processor 102 then combines the determined images to provide a combined image (step 306) and uses computer vision techniques on the combined image for visual inspection of the object 103 (step 308) and to enable performing inspection tasks, such as, defect detection, QA, sorting and/or counting. In some embodiments, processor 102 causes the combined image to be displayed on user interface device 106.

In one embodiment, the method includes detecting the object in a first image of the plurality of images obtained in step 302, e.g., in image 21 or 22. The object may then be detected in the combined image using characteristics of the object detected in the first image, such as by using spatial parameters of the object detected in the first image.

The object may be a whole object and/or a region of interest on an object. In some embodiments a region of interest (ROI) may be automatically detected by a processor, e.g., by using image analysis techniques. Pixels associated with a detected object (or ROI) may be determined by using image analysis algorithms such as segmentation. In some embodiments, a processor receives indications of an outline (e.g., borders) of the object from a user and determines which pixels are associated with the object, possibly using segmentation and based on the borders of the object.

For example, based on user input of an ROI on an image of an item on an inspection line, a processor may create an outline or other indication surrounding the ROI. An indication of ROI, input by a user, may include coordinates and/or may include a line, e.g., a colored line, a broken line or other style of line, or polygon or other shape surrounding the region of interest.

The ROI may be an area on the object which is associated with defect detection. For example, an ROI may be an area on the object in which a user requires defect detection or an area on the object in which the user does not require defect detection. Thus, visual inspection algorithms (e.g., processes to detect defects on items) may be conditionally applied, based on an ROI. Additionally, same-type objects may have permitted differences, which are not defects. For example, objects may have texture, pattern or color differences or moving parts on the object surface, which are not considered to be defects. In some embodiments, these areas of permitted differences may be defined as ROIs in which visual inspection algorithms are not applied, thus avoiding false detection of defects.

In some embodiments, specific, limited areas may be defined in an image, which are ROIs in which glare cannot be tolerated. Processor 102 may control light source 105 to differentially illuminate the image based on determination of an ROI. For example, if an ROI is determined on a bottom right corner of an object (in an area covered by segments D and F, for example) the relevant segments of light source 105, that can provide an image without glare at the bottom right corner of the object, may be turned on while other segments of light source 105 which create glare in the ROI may not be turned on.

In some embodiments, based on detection of an object during the setup stage, a same-type object can be easily detected in an image in the inspection stage, prior to, or in parallel to, obtaining different-illumination-pattern images of the object. Additionally, the object may be easily detected in a combined image based on detection of the object in at least one of the images used to create the combined image. For example, spatial properties and uniquely representing features or attributes of the object may be detected in a first image of the object and may then be available when performing visual inspection of a same-type object in a combined image, thereby saving time by avoiding the need to detect these features in the combined image.

Figure 4:
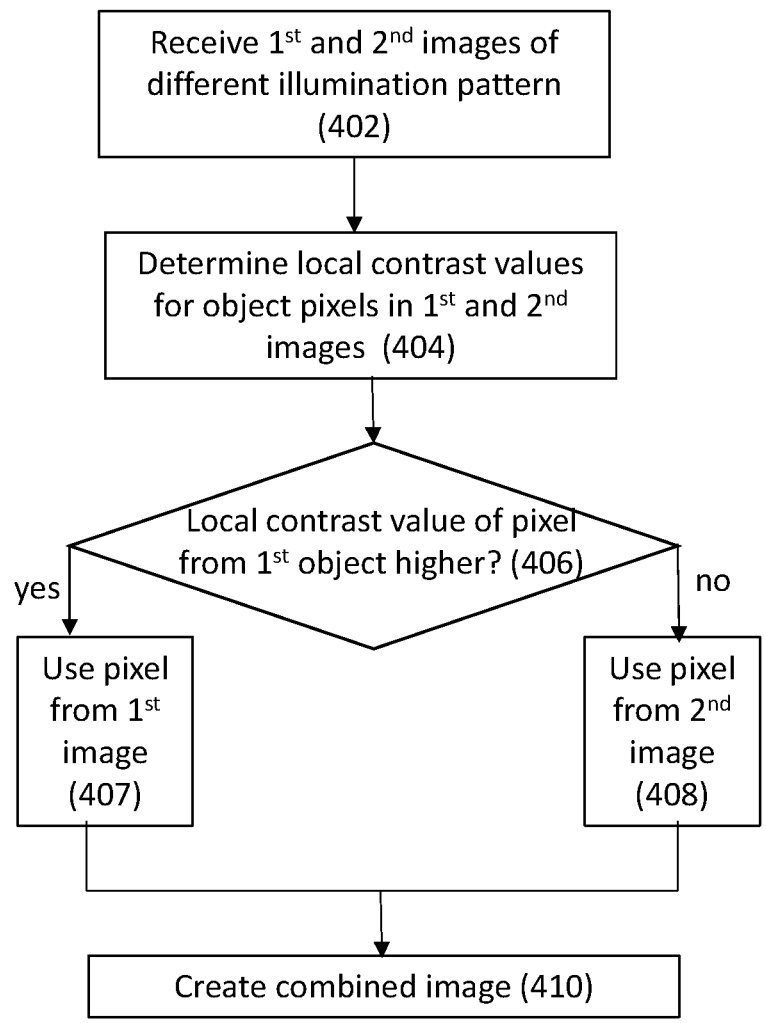
FIG. 4 schematically illustrates a method for determining which of the plurality of images provide a combined image of the object showing the most detail of the object, according to embodiments of the invention.

FIG. 4 schematically illustrates an example of how processor 102 determines, in step 304 above, which of the plurality of images provide a combined image of the object showing the most detail of the object.

In this example, processor 102 receives first and second images from the plurality of different-illumination-pattern images (step 402) (e.g., images 21-26). Processor 102 determines a measure of information of pixels associated with the object in the first image and the second image and compares the information measures for each pixel in the first image and second image.

In one embodiment, the information measure includes local contrast values for pixels associated with the object in the first image and the second image. In this example, processor 102, determines local contrast values of pixels associated with the object in the first image and the second image (step 404) and compares the local contrast values for each pixel in the first image and second image, e.g., to determine a pixel with the higher local contrast value. If a pixel from the object in the first image has a local contrast value higher than the same pixel in the second image (decision point 406) then the pixel from the first image is used (step 407) to create the combined image (step 410). If the pixel from the first image has a local contrast value lower than that same pixel in the second image (decision point 406) then the pixel from the second image is used (step 408) to create the combined image (step 410). This process can be repeated for all pixels associated with the object. As described above, pixels associated with the object may be determined by using image analysis algorithms such as segmentation.

In some embodiments, combining images to obtain a combined image includes creating pixels of the combined image based on a statistic of values of corresponding pixels in the first and second images. Typically, statistics (one or a combination of statistics) that provide a measure of information are used, such as, local contrast value, minimum or median channel values for pixels in the first and second images, etc. In some embodiments, the values of pixels of the combined image may be based on a weighted average of values of the corresponding pixels in the first and second images. For example, a specific pixel or area (which includes a plurality of pixels) in a first image has a pixel value $I_1$ and an information measure $V_1$. That corresponding pixel or area in a second image has a pixel value of $I_2$ and an information measure $V_2$, and that corresponding pixel or area in a third image has a pixel value $I_3$ and an information measure $V_3$. The contribution of each of the three images to the corresponding pixel or area in the combined image is partial and dependent on the information measure of the pixel in each of the images used to create the combined image. Thus, the combined image (Ic) can be a weighted average of the three images as follows:

$$Ic=(I_1 \times V_1 + I_2 \times V_2 + I_3 \times V_3)/(V_1+V_2+V_3)$$

Other measurements of pixels information may be used and other statistical calculations may be used to provide a combined image.

Figure 5A:
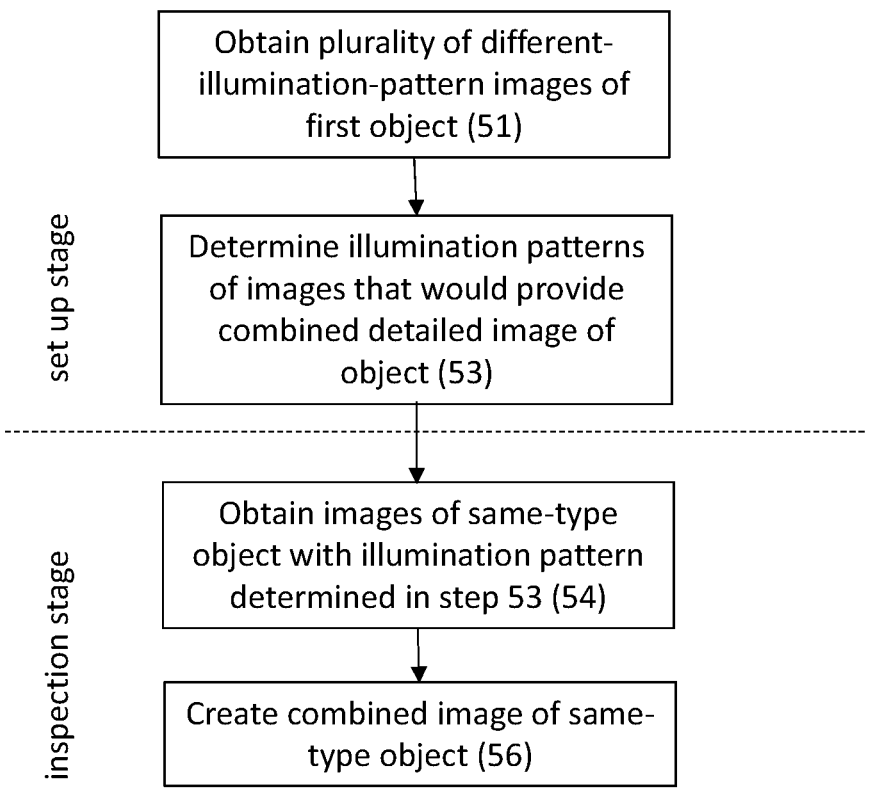
FIGS. 5A and 5B schematically illustrate methods for obtaining substantially glare-free images for visual inspection in an inspection stage, based on processing in the setup stage, according to embodiments of the invention.
Figure 5B:
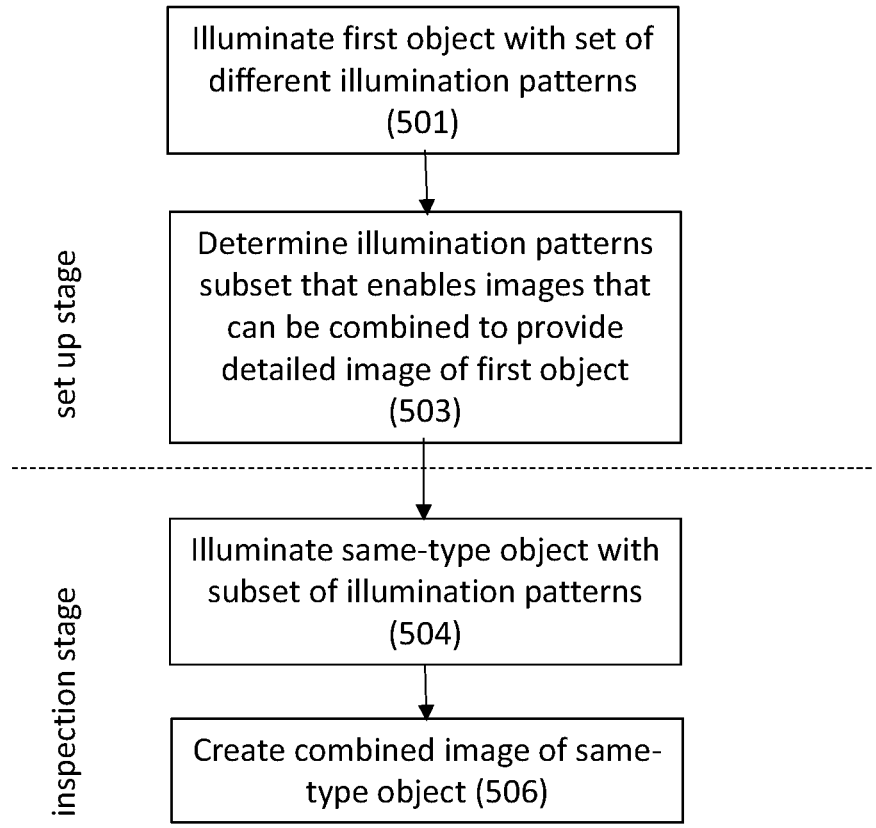

In some embodiments, examples of which are schematically illustrated in FIGS. 5A and 5B, the patterns of illumination and the number of different-illumination-pattern images that can be combined to provide the most details of the object, are determined during the setup stage and are then automatically used during the inspection stage, to obtain a combined substantially glare-free image of the object for visual inspection of the object.

In one embodiment, which is exemplified in FIG. 5A, processor 102 receives a plurality of different-illumination-pattern reference images of a first object (step 51), during the setup stage. The processor determines, during the setup stage, which reference images have the specific illumination pattern such that, when combined, provide a combined image of the object showing the most detail of the object (step 53). This may be done, for example, by detecting pixels having the higher local contrast value, as described above.

Then, in the inspection stage, processor 102 obtains (step 54) the same number of images of an inspected object (which is a second, same-type object), having the specific illumination patterns determined during the setup stage, in step 53 and combines the images of the second, same-type object, to provide a combined image for visual inspection of the second, same-type object (step 56). This may be done, for example, by using the same pixels or areas of the image detected (based on their information measure) in the setup images of the first object, to obtain a combined image of the second object for visual inspection of the second object.

In some embodiments items on the inspection line may be positioned or oriented in rotation relative to each other. For example, an inspected item (such as item 4 in FIG. 1B) may be placed on the inspection line at a 90° or other angle relative to the items in the reference images (e.g., items 2 and/or 2' in FIG. 1A). In this case, a corresponding rotation of the illumination pattern can be calculated and performed during the inspection stage. For example, using light source 105 illustrated in FIG. 2A, an illumination pattern determined (during the setup stage) to provide images of item 2 that when combined will provide a substantially glare-free image, includes a first illumination phase where all segments of the light source illuminate, a second illumination phase where only left side segments illuminate and a third illumination phase where only right side segments illuminate. During the inspection stage item 4 is determined to be rotated 90° to the right, relative to the position and orientation of item 2. In this case the illumination pattern used on item 4 will include a first illumination phase where all segments of the light source illuminate, a second illumination phase where only the uppermost segments illuminate and a third illumination phase where only lower most segments illuminate.

Thus, during the setup stage, a processor analyzing the reference images, determines a number of different illumination pattern setup images of a first object, which, when combined, provide a substantially glare-free image of the first object. During the inspection stage, the same number of images of a second same-type object, with illumination patterns based on the illumination patterns determined in the setup stage, are obtained and combined to provide a combined image for visual inspection of the second object.

Comparing information measures of pixels between images captured at different illumination/exposure patterns enables finding (during the setup stage) the minimal number of different images required to obtain a combined image that has the most information of the object.

A minimal number of images required to obtain a substantially glare-free image of an object, can be determined (during the setup stage) by using different optimization techniques and algorithms. In one example, a minimal number of images is calculated using a penalty score utilizing penalty factors which may be natural numbers (including zero). For example, a first penalty factor may be assigned to the number of images used to create the combined image, whereas a second penalty factor (which may be the same or different than the first penalty factor, typically a number having a negative sign relative to the first penalty factor) may be assigned to each pixel having a higher information value in the combined image. A minimal number of images may be determined by calculating the penalty score for all permutation groups of the images and/or by using optimization techniques and algorithms. Typically, the first penalty factor will attempt to impose a small as possible number of images used to create the combined image, while the second penalty factor will attempt to impose a combined image showing the most details of the imaged object.

This process enables determining, in the setup stage, a minimal number of images required to obtain a substantially glare-free image of an object. This minimal number of images can then be used during the inspection stage. Obtaining the least possible number of images of each item during inspection, enables a quick and therefore efficient inspection process.

In some embodiments the first object (imaged during the setup stage) is a defect-free object and the second, same-type object (imaged during the inspection stage), is either defect-free or defected.

In the example schematically illustrated in FIG. 5B, processor 102 controls illumination from a light source to illuminate a set of pulses of light which includes several patterns (step 501) to enable the camera to capture a plurality of different-illumination-pattern images in the setup stage. The processor determines (step 503), as described above, during the setup stage, which subset of illumination patterns (some of the illumination patterns used in step 501, preferably, a minimal subset) enable a combined image of the object showing the most detail of the object.

In the inspection stage, processor 102 controls the light source (step 504) to illuminate the subset of illumination patterns determined in step 503, and combines the images obtained while illuminating, to provide a combined image for visual inspection of the second, same-type object (step 506).

Figure 6:
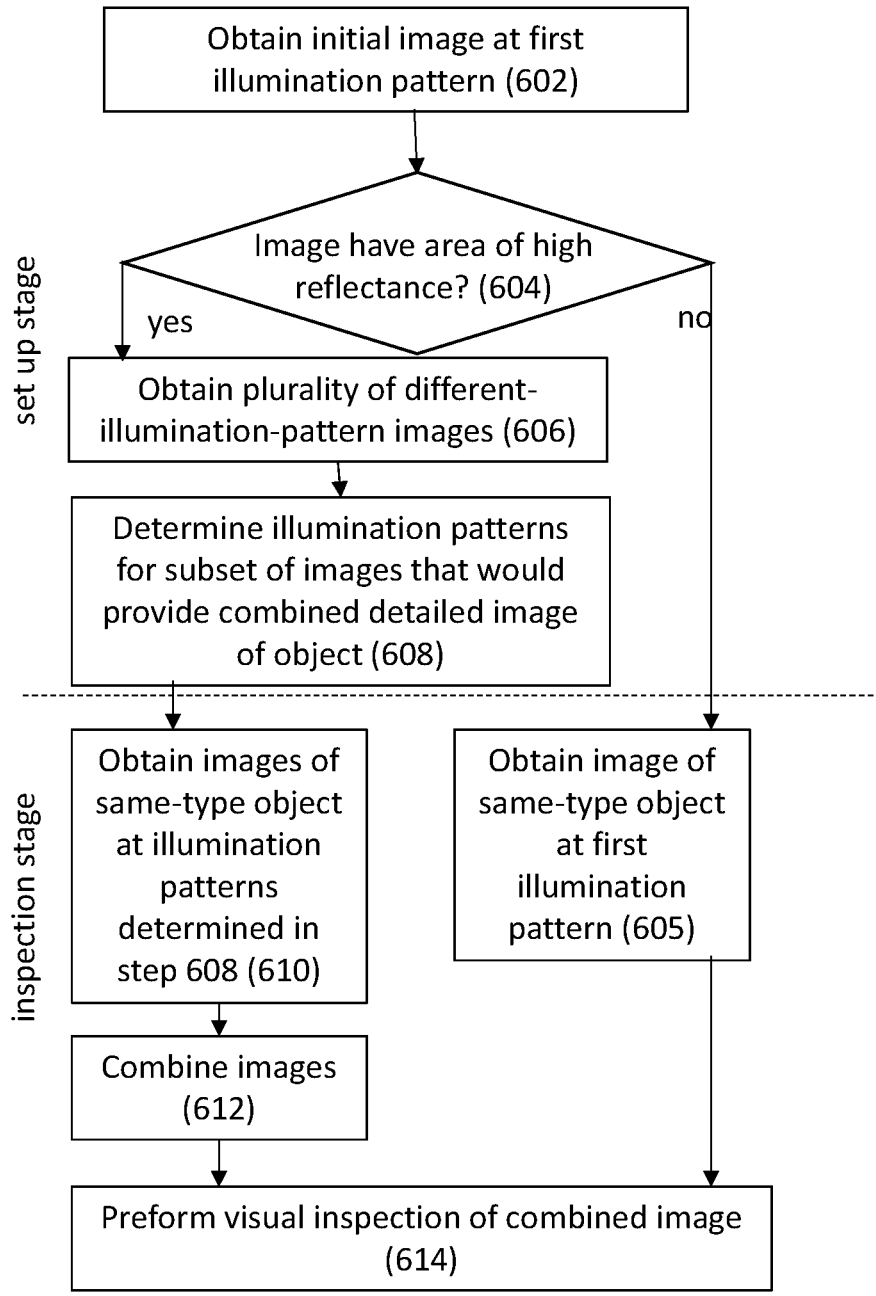
FIG. 6 schematically illustrates a method for obtaining a substantially glare-free image for visual inspection, according to another embodiment of the invention.

As schematically illustrated in FIG. 6, embodiments of the invention can include obtaining, typically at the setup stage, an initial image of the object on the inspection line (step 602), the initial image obtained in a first specific illumination pattern, typically a pattern including illumination of all segments of the light source (such as image 22). The initial image is obtained prior to obtaining the plurality of different-illumination-pattern images, to check if the initial image includes areas of high reflectance or glare.

Determining if an image includes areas of high reflectance can be done based on user input and/or by applying image processing algorithms on the image to detect, for example a number (e.g., above a threshold) of closely related saturated pixels. For example, if, while illuminating a camera FOV, there is a burst in saturation level in a pixel or adjacent pixels, this can indicate that using this illumination pattern will result in saturated areas on the object. In another example, if there is a pixel or adjacent pixels for which there is a drop in the information level while the illumination intensity rises, this can indicate glare or saturation.

If the initial image does not include areas of high reflectance (decision point 604) then the specific illumination pattern used to obtain the initial image is used during the inspection stage to obtain an image of a same-type object (step 605) for performing visual inspection of the same-type object (step 614). If the initial image includes an area of high reflectance (decision point 604) then, still during the setup stage, a plurality of different-illumination-pattern images of the object are obtained (step 606) and processed, e.g., as described herein, to determine (step 608) the illumination patterns that produce a subset (typically, a minimal subset) of the plurality of images, the subset including images that when combined, provide a combined image of the object showing the most detail of the object. Then the specific illumination patterns determined in step 608 are used during the inspection stage to obtain images of a same-type object (step 610). The images are combined to provide a combined image (step 612) for performing visual inspection of the same-type object (step 614).

In some embodiments, a high dynamic range (HDR) image of the object is obtained for improved image quality. An HDR image can be obtained by capturing a plurality of images of an object, each image having a different exposure value. Pixel values of the obtained images are compared to the dynamic range of the camera used to capture these images. A minimal number of optimal images can be determined based on the comparison. These optimal images are then combined to obtain an HDR image of the object.

An optimal image may be determined based on a difference between values of pixels of the image to a middle value of the dynamic range. For example, an optimal image may be an image having evenly distributed pixel values, an image with no over and/or under exposed areas (or with the least over and/or under exposed areas), etc.

For creating an HDR image using two (or more) images, a set of two (or more) optimal images may include images that together have pixels that are closest to the middle of the dynamic range and/or fulfill other conditions, as described above. For example, an HDR image can be created by taking from two (or more) images the pixel whose value is closer to the middle of the dynamic range of the camera.

Typically, the minimal number of optimal images and the exposure levels at which they were captured, are both determined during the setup stage. During the inspection stage the same number of images at the same exposure levels as determined during the setup stage, are used to obtain an HDR image of an object for visual inspection. In one embodiment an HDR image of the object on the inspection line is obtained (prior to obtaining a plurality of different-illumination-pattern images of the object) and if the HDR image includes an area of high reflectance then a plurality of different-illumination-pattern images of the object are obtained as described herein.

In one embodiment, the plurality of different-illumination-pattern images may also serve as the plurality of images from which an HDR image can be constructed. Thus, during a setup stage, processor 102 may control light source 105 to illuminate in several illumination patterns and at the same time control the camera 103 to capture images at different exposure levels. Processor 102 can then process the different-illumination-pattern images obtained at different exposure levels to determine which exposure levels and/or which illumination patterns to use during the inspection stage to obtain high quality, glare-free images for visual inspection.

Figure 7:
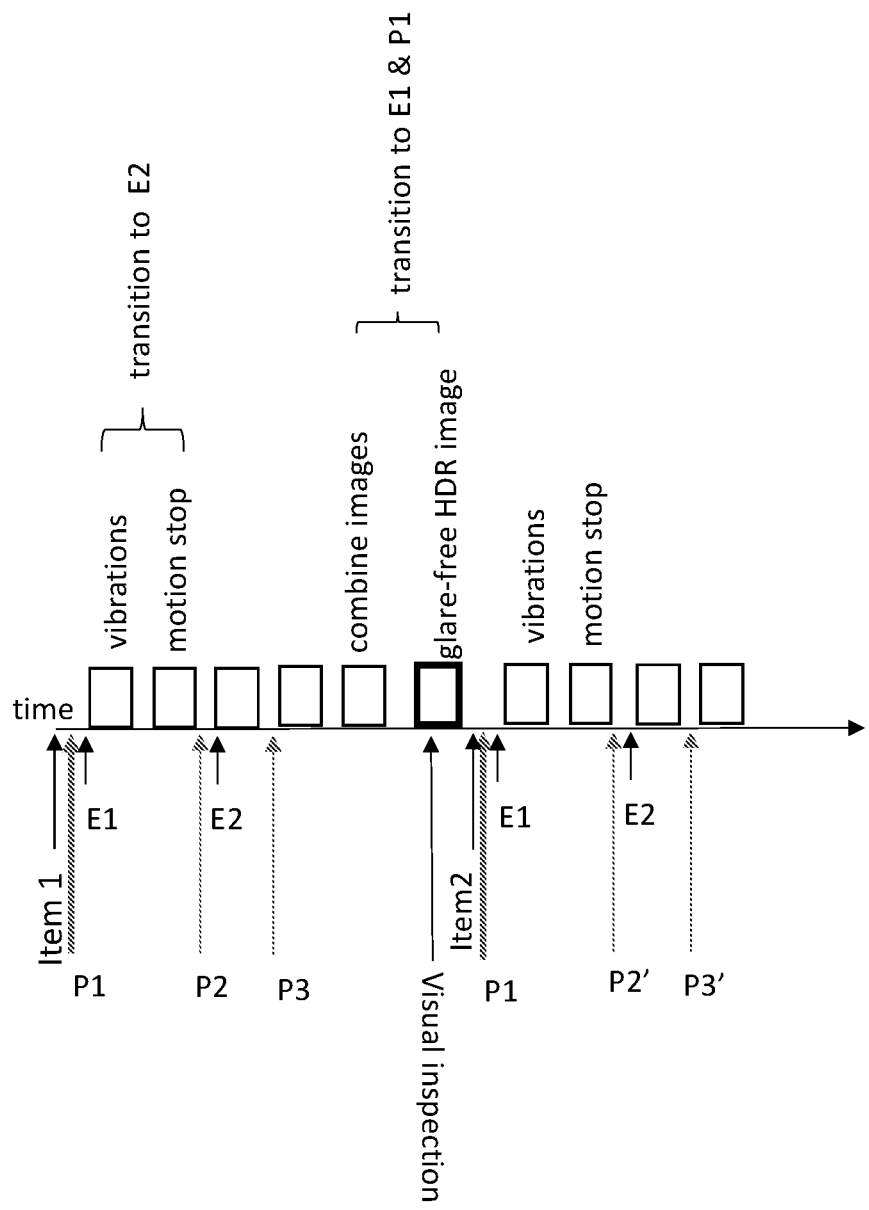
FIG. 7 schematically illustrates a timeline of a visual inspection process, including obtaining a glare-free HDR image, according to an embodiment of the invention.

In the time line exemplified in FIG. 7, methods according to embodiments of the invention enable a time effective process of obtaining high quality images for visual inspection.

A first item (item 1) is placed on an inspection line, typically during the inspection stage. Item 1 is then illuminated in an illumination pattern P1 which enables detecting the item (e.g., an illumination pattern in which all segments of an illumination device are on), as pre-determined in the setup stage. An image is captured in these illumination conditions and at a first exposure level E1 (which was determined during the setup stage).

The image captured at E1 and in illumination pattern P1 can be used to detect the item within the image, while movements and vibrations of the camera and/or item (e.g., due to conveyor belt and/or other machinery movement), stop. Additionally, the camera can transition to exposure level E2 while the movements and vibrations of the camera and/or item stop. The light source is controlled to illuminate at a second illumination pattern P2 (e.g., an illumination pattern in which only left hand segments or uppermost segments of an illumination device are on) and an image of the item is captured at exposure level E2 and illumination pattern P2. While the camera parameters are set at exposure level E2, the illumination device is controlled to illuminate at another, different, illumination pattern P3 (e.g., an illumination pattern in which only right hand segments or lowermost segments of an illumination device are on). The processor then combines the image captured at E1 and illumination pattern P1 and the two images captured at exposure level E2 and illumination patterns P2 and P3, providing a substantially glare-free HDR image.

Since the object has already been detected, the processor may immediately use the glare-free HDR image for visual inspection (e.g., displaying the image and/or running visual inspection algorithms on the image). In parallel, the camera transitions back to exposure level E1 and to illumination pattern P1 to obtain an image of a next object (item 2). Thus, in some embodiments processor 102 controls transitioning from a first illumination pattern to a second illumination pattern while applying visual inspection algorithms on the combined glare-free image.

Item 2 is detected in the image(s) obtained at exposure level E1 and illumination pattern P1. As discussed above, item 2 may be orientated differently than the same type item used during the set up process, while the exposure levels and illumination patterns are determined. If there is a change of orientation, it is detected in the image(s) captured at exposure level E1. Once a change in orientation is detected, the second illumination pattern used during exposure level E2 is rotated according to the detected change in orientation of the item, such that the second illumination pattern P2' is rotated compared to illumination pattern P2. Similarly, the third illumination P3' pattern used to image item 2, is rotated compared to illumination pattern P3. For example, for an illumination device including a square divided to equal segments, if in illumination pattern P2 only the left hand segments of the illumination device are on, for an item 2 that is in an orientation perpendicular compared to item 1 (and compared to the orientation of the item imaged during the set up stage) illumination pattern P2' will include only the uppermost segments being on. Similarly, if illumination pattern P3 includes only the right hand segments of the illumination device being on, illumination pattern P3' will include only the lowermost segments being on.

The embodiments described herein enable an automated visual inspection process, requiring minimal user involvement, which provides high quality, unobscured images of objects, for visual inspection in an efficient inspection process.

The invention claimed is:

1. A method for an automated visual inspection process of an object on an inspection line, the method comprising:
    illuminating the object on the inspection line, with pulses of a first pattern illumination and pulses of a second pattern illumination, the pulses being repeated at a constant frequency, to provide a flicker-free inspection environment for human workers, the pulses of the first and second patterns being temporally offset from each other and partially overlapping in time;
    controlling camera exposure events in synchronization with the pulses to capture a plurality of images of the first and second illumination patterns separately and simultaneously; and
    utilizing at least one of the plurality of images to perform visual inspection of the object.

2. The method of claim 1, further comprising:
    obtaining an image at a time which coincides with the overlap between a pulse of the first pattern and a pulse of the second pattern; and
    utilizing the image to perform visual inspection of the object.

3. The method of claim 1, wherein the automated visual inspection process comprises a setup stage prior to an inspection stage in which an object is inspected, the method further comprising:
    during the setup stage, determining a minimal number of images having corresponding illumination patterns which, when combined, provide a combined image of a first object showing maximal detail of the first object;
    during the inspection stage, obtaining the minimal number of images of a second, same-type object, having the corresponding illumination patterns determined during the setup stage; and
    combining the images of the second, same-type object, to provide a combined image to preform visual inspection of the second, same-type object.

4. The method of claim 3, wherein the first object is a defect-free object and wherein the second, same-type object, is one of defect-free or defective.

5. The method of claim 3, further comprising:
    obtaining, during the inspection stage, a minimal number of images of the second object, having illumination patterns which are based on an orientation of the second object in relation to an orientation of the first object.

6. The method of claim 1, wherein the object comprises an area of interest within an item.

7. The method of claim 1, further comprising:
    obtaining a high dynamic range (HDR) image of the object on the inspection line prior to obtaining the plurality of images of the object; and
    obtaining the plurality of images of the object if the HDR image comprises an area of high reflectance.

8. The method of claim 1, further comprising:
    obtaining a first image at a time which coincides with a pulse from the first pattern but not a pulse from the second pattern;
    obtaining a second image at a time which coincides with a pulse from the second pattern but not a pulse from the first pattern; and
    utilizing at least one of the first and second images to perform visual inspection of the object.

9. The method of claim 8, further comprising:
    combining the image obtained during the overlap between the pulse of the first pattern and the pulse of the second pattern with the first image or the second image, to obtain a combined image; and
    utilizing the combined image to preform visual inspection of the object.

10. The method of claim 1 comprising:
    combining at least a first image and second image from the plurality of images to provide a
    combined image; and using the combined image to perform visual inspection of the object.

11. The method of claim 10, further comprising displaying the combined image to a user.

12. The method of claim 10, further comprising:
    creating pixels of the combined image based on a statistic of values of corresponding pixels in each of the first and second images.

13. The method of claim 12, wherein values of pixels of the combined image are based on a weighted average of values of the corresponding pixels in each of the first and second images.

14. A system for automated visual inspection, the system comprising:
    a camera configured to capture images of an object on an inspection line;
    a light source to produce light pulses repeated at a constant frequency, the light pulses temporally offset and partially overlapping, and illuminating a field of view (FOV) of the camera in a first pattern of illumination and second pattern of illumination; and
    a processor in communication with the camera and light source, the processor being configured to control the light source to differentially illuminate the FOV of the camera and to synchronize exposure events of the camera with the light pulses such that exposure events of the camera capture a first pattern of illumination and a second pattern of illumination separately and simultaneously, to produce different illumination pattern images in a flicker-free inspection environment for human workers.

15. The system of claim 14, wherein the processor is further configured to combine images obtained by the camera to provide a combined image and further configured to utilize the combined image to perform visual inspection of the object.

16. The system of claim 14, wherein the processor is further configured to control the light source to differentially illuminate the FOV of the camera based on an orientation of the object within the images.

17. A method for an automated visual inspection process of an object on an inspection line, the method comprising:
- illuminating the object on the inspection line, with pulses of a first pattern illumination and pulses of a second pattern illumination, the pulses being repeated at a constant frequency, to provide a flicker-free inspection environment for human workers, and the pulses of the first pattern and second pattern being temporally offset from each other;
- controlling camera exposure events in synchronization with the pulses to capture a plurality of images, each of the images being illuminated with a different illumination pattern;
- utilizing at least one of the plurality of images to perform visual inspection of the object;
- obtaining a high dynamic range (HDR) image of the object on the inspection line prior to obtaining the plurality of images of the object; and
- obtaining the plurality of images of the object if the HDR image comprises an area of high reflectance.

\* \* \* \* \*